(12) United States Patent
Sridharan et al.

(10) Patent No.: US 9,042,384 B2
(45) Date of Patent: May 26, 2015

(54) DISTRIBUTED ROUTING DOMAINS IN MULTI-TENANT DATACENTER VIRTUAL NETWORKS

(75) Inventors: Murari Sridharan, Sammamish, WA (US); Narasimhan Venkataramish, Redmond, WA (US); Yu-Shun Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 318 days.

(21) Appl. No.: 13/603,281

(22) Filed: Sep. 4, 2012

(65) Prior Publication Data

US 2013/0058346 A1 Mar. 7, 2013

Related U.S. Application Data

(60) Provisional application No. 61/532,002, filed on Sep. 7, 2011, provisional application No. 61/593,772, filed on Feb. 1, 2012.

(51) Int. Cl.
*H04L 12/28* (2006.01)
*H04L 12/713* (2013.01)

(52) U.S. Cl.
CPC .................................. *H04L 45/586* (2013.01)

(58) Field of Classification Search
None
See application file for complete search history.

(56) References Cited

U.S. PATENT DOCUMENTS

| | | | |
|---|---|---|---|
| 7,447,212 B2 | 11/2008 | Hu | |
| 7,561,531 B2 * | 7/2009 | Lewites et al. | 370/254 |
| 7,885,276 B1 | 2/2011 | Lin | |
| 7,944,923 B2 * | 5/2011 | Tripathi et al. | 370/392 |
| 8,055,789 B2 * | 11/2011 | Richardson et al. | 709/238 |
| 2005/0063411 A1 * | 3/2005 | Wang et al. | 370/437 |
| 2005/0114490 A1 | 5/2005 | Redlich et al. | |
| 2007/0280243 A1 * | 12/2007 | Wray et al. | 370/392 |
| 2008/0256607 A1 | 10/2008 | Janedittakarn et al. | |
| 2009/0288084 A1 * | 11/2009 | Astete et al. | 718/1 |
| 2010/0107162 A1 * | 4/2010 | Edwards et al. | 718/1 |
| 2010/0138830 A1 | 6/2010 | Astete et al. | |
| 2010/0257263 A1 * | 10/2010 | Casado et al. | 709/223 |
| 2011/0075674 A1 * | 3/2011 | Li et al. | 370/401 |
| 2011/0265168 A1 | 10/2011 | Lucovsky et al. | |
| 2011/0283017 A1 * | 11/2011 | Alkhatib et al. | 709/244 |

OTHER PUBLICATIONS

Mudigonda, Jayaram et al., "NetLord: A Scalable Multi-Tenant Network Architecture for Virtualized Datacenters," Proceedings of the ACM SIGCOMM 2011 Conference, Aug. 15-19, 2011, pp. 62-73, Toronto, Ontario, Canada (downloaded from: http://conferences.sigcomm.org/sigcomm/2011/papers/sigcomm/p62.pdf).

Pfaff, Ben, et al., "Extending Networking in the Virtualization Layer," 8th ACM Workshop on Hot Topics in Networks (HotNets-VIII), Oct. 2009, (6 pages), (downloaded from: http://www.icsi.berkeley.edu/pubs/networking/extendingnetworking09.pdf).

* cited by examiner

*Primary Examiner* — Brian Roberts
(74) *Attorney, Agent, or Firm* — John Jardine; Kate Drakos; Micky Minhas

(57) ABSTRACT

A distributed routing domain is disclosed wherein each user or tenant can deploy a multi-subnet routing topology in a network-virtualized datacenter. A virtualization module implements the distributed routing domain and enforces a multi-subnet routing topology in a distributed fashion without requiring a standalone physical router or VM router. The topology and the routing rules are distributed in a network virtualization module on each hypervisor host, and collectively realize the multi-subnet topology for a virtual network over any physical network topology.

18 Claims, 9 Drawing Sheets

DISTRIBUTED ROUTING DOMAINS IN MULTI-TENANT DATACENTER VIRTUAL NETWORKS

RELATED APPLICATIONS

This application claims priority under 35 U.S.C. §119(e) to U.S. Provisional Application Ser. No. 61/532,002, entitled "A SCALABLE AND FLEXIBLE DATA CENTER NETWORK USING GENERIC ROUTING ENCAPSULATION," filed on Sep. 7, 2011, and U.S. Provisional Application Ser. No. 61/593,772, entitled "GRE OFFLOAD FOR SR-IOV NICS," filed on Feb. 1, 2012, which are herein incorporated by reference in their entirety.

BACKGROUND

Server virtualization allows multiple virtual machines (VM) to run on a single physical server. Virtualization allows users to move their servers to a "cloud" and to take advantage of the flexibility and scalability offered by running services on VMs. However, some users are hesitant to move their services to a cloud due to concerns such as control over deploying services to the cloud, moving services to different cloud providers, and the capability to move services back to the user's own enterprise datacenter.

Existing virtual datacenters can make deployment of VMs labor intensive. Particularly, when the cloud hosters require users to change the IP addresses for services when the services are moved to the cloud environment. While this may appear to be a minor deployment detail, the IP address typically has real semantic meaning to an enterprise. Network, security, compliance, and performance policies often incorporate and are dependent on the actual IP address of a given service. Moving a service to existing cloud providers requires rewriting of all these policies to take into account the new IP addresses for the services. This can be difficult because the policies may be spread among a number of different organizations that control those policies. Each time a user moved to a different cloud provider, then the new host would assign a different set of IP addresses, which would require another policy rewrite. The current situation blocks many users and scenarios from adopting the cloud.

Users want their services in the cloud to appear similar to the services running in their internal datacenters. At the same time, users want the cloud services to adhere to existing policies and to provide isolation from other VMs running in the cloud hosting environment. In summary, users demand that cloud services are as isolated and as safe as if were running in the user's own datacenter. To fulfill user requirements, the cloud host should have the capability to provide networks among the VMs that allow users to maintain existing IP addresses.

Existing network-virtualization architecture provides only a single virtual subnet for a set of virtual machines (VMs). As a result, communications between VMs of different virtual subnets must go through one or more physical gateways or routers. This can be cumbersome to setup and introduces overhead when traversing external gateways or routers with server virtualization. An additional problem involves the management of a multi-subnet topology in a network virtualized datacenter, which requires both managing network virtualization policy on VM host and configuring a different set of network routes on the gateways/routers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments disclosed herein propose the concept of a distributed routing domain wherein each user or tenant can deploy a multi-subnet routing topology in a network-virtualized datacenter. A virtualization module implements the distributed routing domain and enforces a multi-subnet routing topology in a distributed fashion without requiring a standalone physical router or VM router. The topology and the routing rules are distributed in a network virtualization module on each hypervisor host, and collectively realize the multi-subnet topology for a virtual network over any physical network topology.

In one embodiment, a distributed routing domain supports a multi-subnet virtual topology over an arbitrary physical network topology. The virtual network provides the ability to route between these subnets such that there is no single failure point. The virtual network may be deployed on top of either a single physical IP subnet or multiple physical IP subnets. The tenant network's topology is reconstructed on the virtual network during migration of VMs. The VMs may be on the same or different physical machines.

The virtual network described herein uses an internal network virtualization router that encapsulates packets that are forwarded between VMs on different host machines. Using encapsulation, the VMs can maintain a tenant's IP addresses while the datacenter uses its own IP address space to route packets between host machines. In one embodiment, Generic Routing Encapsulation (GRE) is used by the network virtualization router. This configuration allows tenants to bring any service to the datacenter and maintain their own IP space and network topology, which means that there is no change for workload owners to use the virtual network. Additionally, the network virtualization router allows a tenant to use any server. VMs can be placed anywhere in the datacenter and the VMs and physical datacenter network can be managed separately. Accordingly, any cloud—private, public, or hybrid—is supported and can be deployed in any datacenter.

In one embodiment, network virtualization is provided in a public cloud scenario that supports one or more networks per customer. Each customer can bring one or more network topologies. The virtual network supports overlapping IP addresses among different customers.

In another embodiment, network virtualization may be provided in a private cloud scenario. For example, multiple networks for different divisions or departments of one customer may be supported by the same physical network in a datacenter.

In the virtual network, customers can have multiple subnets that are routable to each other so that VMs in one subnet can communicate with VMs in other subnets of the same customer network. Each routable topology with one or more subnets forms a Routing Domain. Each customer can have multiple such topologies in the cloud, but each virtual network is isolated from the others. The Routing Domains are the isolation boundary to accommodate overlapping IP address spaces from different customers.

Embodiments implement a distributed router with a multiple VM network topology that is indexed by both routing domain identifiers and virtual subnet identifiers.

DRAWINGS

To further clarify the above and other advantages and features of embodiments of the present invention, a more particular description of embodiments of the present invention will be rendered by reference to the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION

In a traditional server virtualization, each individual physical host is converted to a virtual machine (VM) that runs on top of a common physical host. Each VM has the illusion that it is running on a dedicated piece of hardware, even though all resources, such as memory, CPU, and hardware peripherals, are actually shared. Network virtualization extends the concept of server virtualization to apply to entire tenant networks. With network virtualization, each physical network is converted to a virtual network that runs on top of a common physical network. Each virtual network has the illusion that it is running on a dedicated network, even though all resources, such as IP addresses, switching, and routing, are actually shared.

Figure 1:
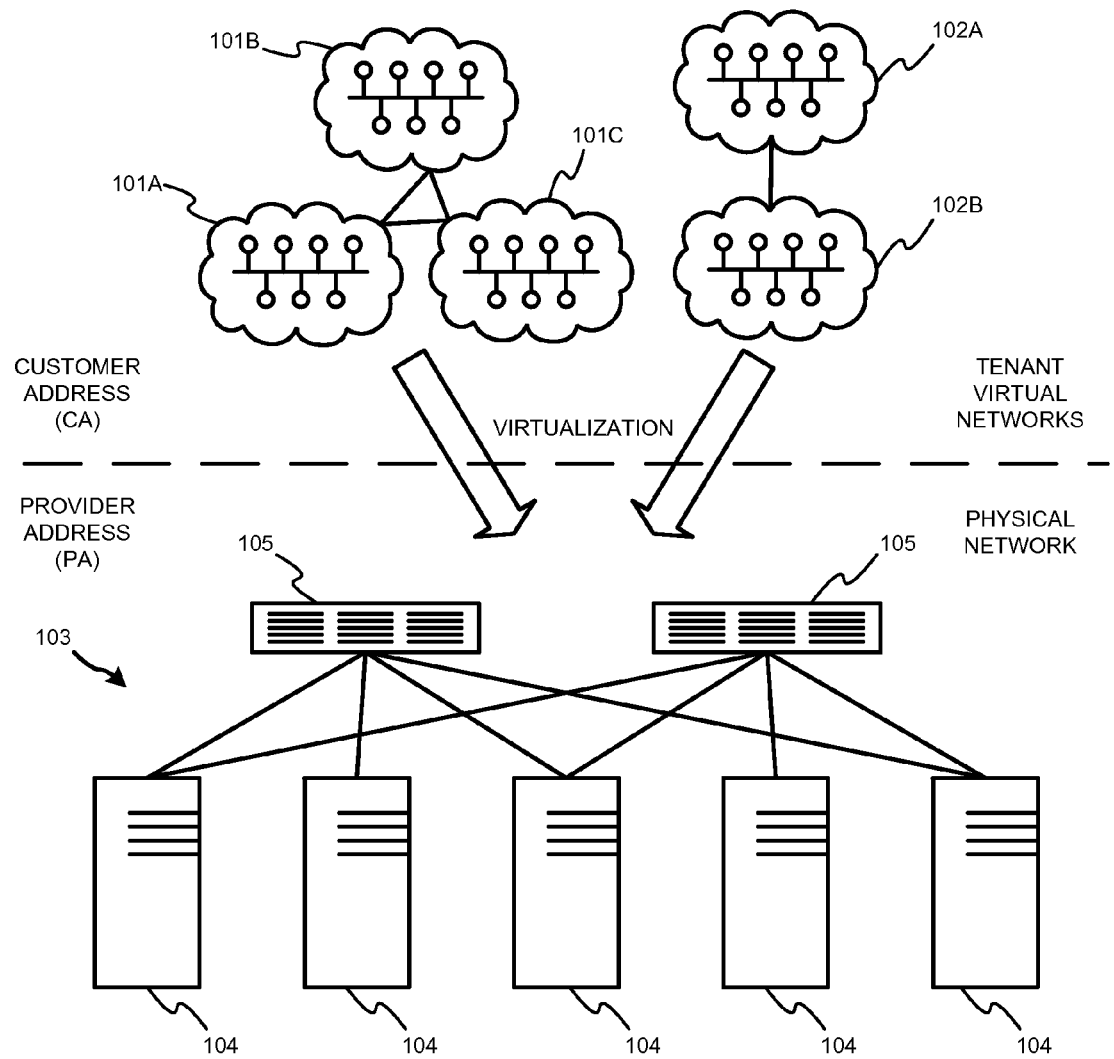
FIG. 1 illustrates a first tenant having a network with three subnets and a second tenant having a network with two subnets.

FIG. 1 illustrates a first tenant having a network with three subnets 101A-101C and a second tenant having a network with two subnets 102A-102B. These subnets 101, 102 run as virtual networks on physical network 103, which comprises a plurality of physical servers 104 interconnected by physical routers 105. Each virtual network 101, 102 has the illusion that it is running as an independent physical network with its own address space.

Network virtualization allows tenants to keep their own internal IP addresses when moving to the cloud while providing isolation from other tenant's VMs—even if those VMs happen to use the exact same IP addresses. As described in more detail below, this is accomplished by giving each VM two IP addresses. One IP address—the Customer Address (CA)—is visible in the VM and is relevant in the context of a given tenant's virtual subnet 101, 102. The other IP address—the Provider Address (PA)—is relevant in the context of the physical network 103 in the cloud datacenter. This decoupling of the tenant and datacenter IP addresses provides many benefits.

One benefit is that a tenant can move their network and subnets to VMs in the cloud without modifying the physical network configuration and without worrying about what other tenants or virtual networks are present in that datacenter. The tenant services will continue to work even if other tenants have the exact same IP address connected to the same virtual switch.

Another benefit is policy enforcement in the VM hosts, which provides a scalable solution for multi-tenant isolation. The network infrastructure does not need to be constructed to isolate tenants from each other. Existing networks often use VLANs for isolation. However, VLANs have scalability limitations and only support a limited number of tenants in a shared datacenter. Additionally, VLANs require the reconfiguration of switches every time a VM is brought up on a new server. In the network virtualization disclosed herein, there is no need to reconfigure the switches for each VM change, which increases the overall operational efficiency of running a datacenter.

A further benefit of network virtualization is that, by allowing tenants to preserve their IP addresses when moving to the cloud, the network virtualization also enables live migration across subnets. Live migration means that any client talking to a service is unaware that the VM hosting the service has moved from one physical host to a different physical host. Previously cross-subnet live migration was impossible because, by definition, if a VM moved from one subnet to a different subnet its IP address must change, which caused a service interruption. However, because each VM in the virtual network has two IP addresses, the IP address that is relevant in the datacenter context—i.e., the Physical Address—can be changed without needing to change the IP address that is in the VM—i.e., the Customer Address. Therefore, when a client is talking to the VM via the CA, the client is unaware that the VM has physically moved to a different subnet. Additionally, using distributed routing domains, the VM is unaware that its IP address has been virtualized. From the VM's perspective, all communication is occurring via the CA IP address.

Figure 2:
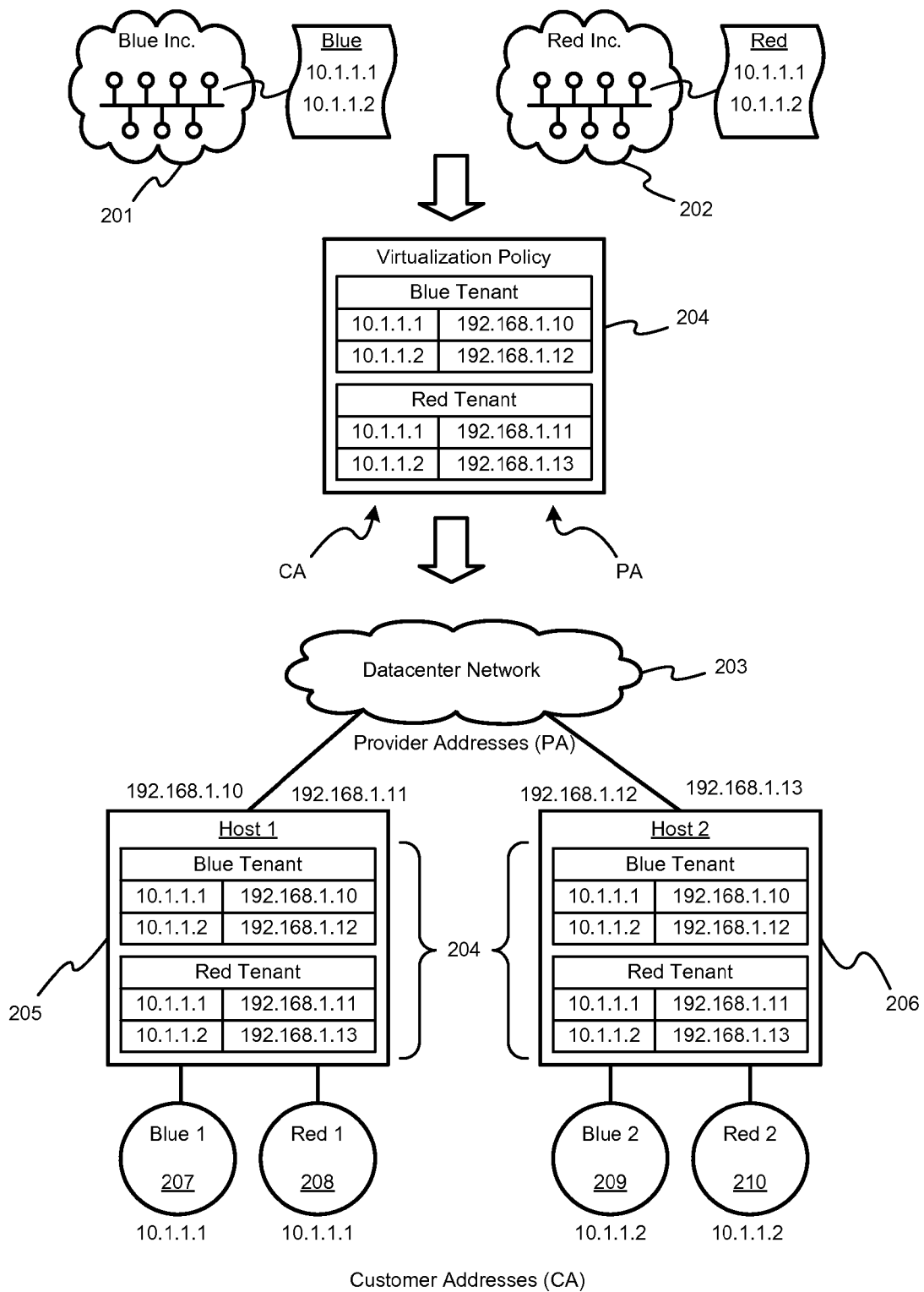
FIG. 2 illustrates an example network virtualization scenario according to one embodiment.

FIG. 2 illustrates an example network virtualization scenario according to one embodiment. Blue Inc. has its own network 201 that uses IP addresses 10.1.1.1 and 10.1.1.2 (i.e., the Blue CAs). Similarly, company Red Inc. also has its own network 202, which also uses IP addresses 10.1.1.1 and 10.1.1.2 (i.e., the Red CAs). If both companies want to virtualize their respective networks 201, 202 on datacenter network 203, there will be an addressing problem due to the overlapping CA space. However, using a network virtualization policy 204, the customer addresses for tenants Blue and Red can be mapped to the physical address space of the host machines that will host the tenants' services.

Host machine 205 and host machine 206 both have a copy of the network virtualization policy 204, which the host machines use for routing packets to the respective VMs 207-210. Host machine 205 uses PA 192.168.1.10 and 192.168.1.11 and host machine 206 uses PA 192.168.1.12 and 192.168.1.13 to communicate with other hosts, routers, and devices on the physical network. If any changes occur for the VMs, such as migration of a VM to a different host, the network virtualization policy should be updated immediately for all host machines.

The virtual network routers can be used to build a hierarchy of routers that are distributed among the host machines so that no physical routers are needed to route packets on a virtual network. The IP address of the VMs or services is no longer a limiting factor. The IP address can stay with the service or VMs and can be moved to any host. The network virtualization policy is used to route packets to the current location of the destination service. The services for one customer can be distributed to different physical locations, but still keep their addresses.

On the other hand, host machines 205 and 206 use CA 10.1.1.1 and 10.1.1.2 to communicate with their hosted VMs. VM 207 is used for services directed to IP address 10.1.1.1 on Blue network 201. On the same host machine 205, VM 208 is used for services directed to CA 10.1.1.1 on the Red network 202. VM 209 is used for services directed to CA 10.1.1.2 on Blue network 201. On the same host machine 206, VM 210 is assigned to service directed to CA 10.1.1.2 on the Red network 202.

IP packets received by datacenter network 203, host 205 or host 206 are routed to the appropriate VM using virtualization policy map 204. For example, when host 205 receives an IP packet addressed to Blue 10.1.1.2 from Blue 1 VM in VM 207, it looks on policy map 204 and determines that the corresponding VM is found at a machine having PA 192.168.1.12. Host 205 encapsulates the IP packet with a destination address of 192.168.1.12 and sends the encapsulated packet to datacenter network 203, which uses the PA 192.168.1.12 to forward the packet to host 206. Host 206 then strips off the encapsulation, identifies the packet as directed to the Blue network CA space. Using policy map 204, host 206 identifies VM 209 as corresponding to CA 10.1.1.2 on the Blue network.

Figure 3:
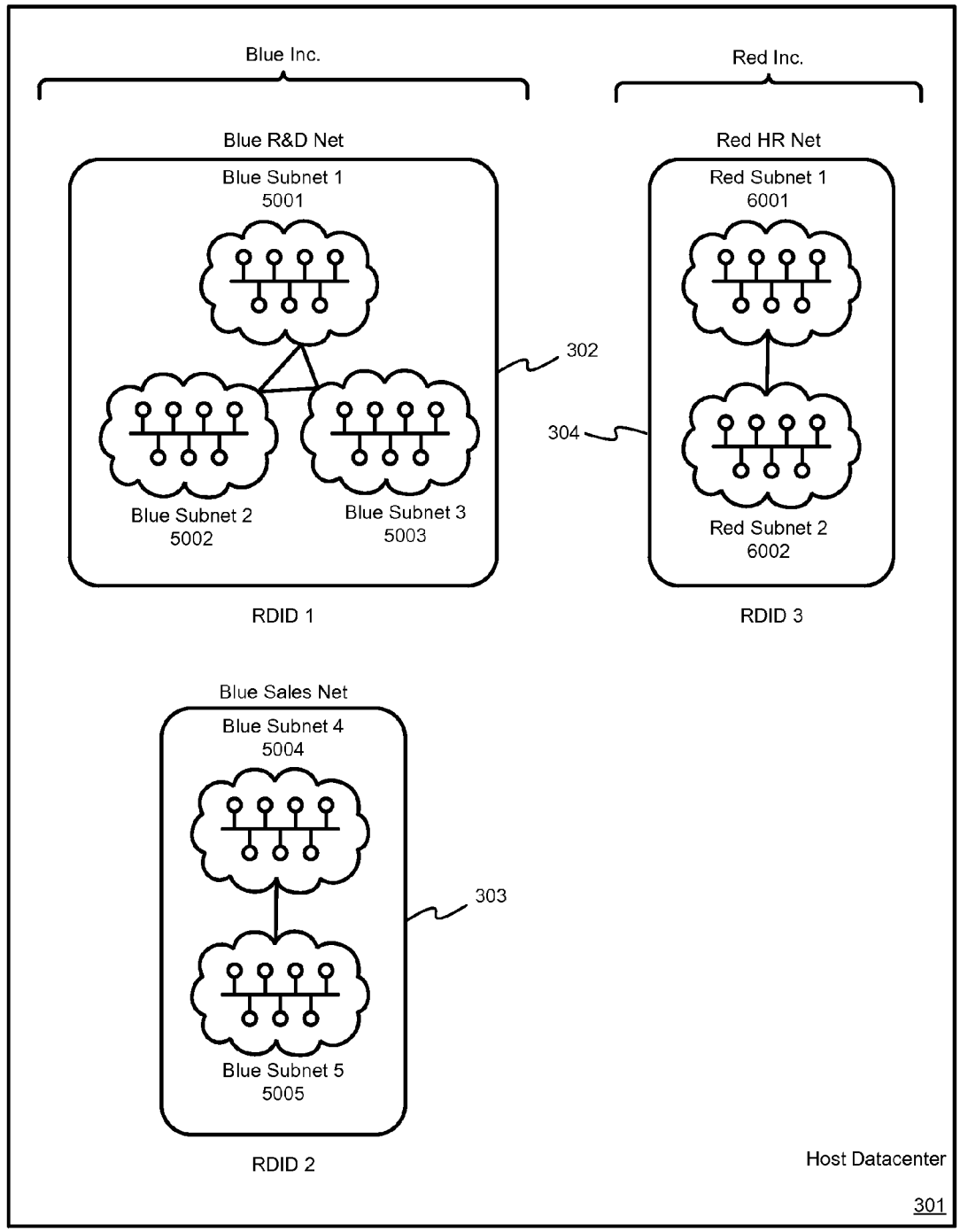
FIG. 3 illustrates a tenant network hierarchy in which three tenant networks have different numbers of subnets.

FIG. 3 illustrates a tenant virtual network hierarchy in which three tenant networks have different numbers of subnets. Host datacenter 301 is supporting two virtual networks for tenant Blue and one virtual network for tenant Red. Blue has an R&D network 302 and a separate sales network 303, for example. These networks may be maintained as if they are separate physical networks with their own—possibly overlapping—customer address space. Red has a single Human Resources (HR) network 304. All of the networks 302-304 have two or more subnets.

Each tenant is considered to be the "owner" of a group of VMs deployed in host datacenter 301. Each customer network 302-304 consists of one or more customer virtual subnets that form an isolation boundary. The VMs address packets using a CA even though that same CA may be used by one or more other customer's subnets. As a result, virtual subnets in the same customer network do not use overlapping IP address prefixes.

Each customer network is assigned by a datacenter administrator or datacenter management software a unique Routing Domain ID (RDID) in the globally unique identifier (GUID) format—e.g., "{11111111-2222-3333-4444-000000000000}". For example, Blue R&D Network 302 is assigned "RDID 1."

Each virtual subnet implements the Layer 3 IP subnet semantics for the VMs within the same virtual subnet. As a result, VMs in a virtual subnet use the same IP prefix, although a single virtual subnet can accommodate both an IPv4 and an IPv6 prefix simultaneously. Each virtual subnet belongs to a single customer network (RDID) and is assigned a Virtual Subnet ID (VSID). In one embodiment, the VSID is a 24-bit number that is unique within the datacenter. For example, the Blue subnets with RDID1 are assigned 5001, 5002, and 5003. The VSID is unique within one hoster datacenter, and a tenant may have multiple VSIDs within a RDID.

The "Distributed Routing Domain" concept corresponds to the customer network as defined above. "Distributed Routing" implements a forwarding topology that matches a multi-subnet topology as shown in FIG. 3. It is referred to as "distributed" because the VMs can be scattered on different physical servers residing in different physical IP subnets. The virtual network topology is completely decoupled from the physical host and physical network topology.

Figure 4:
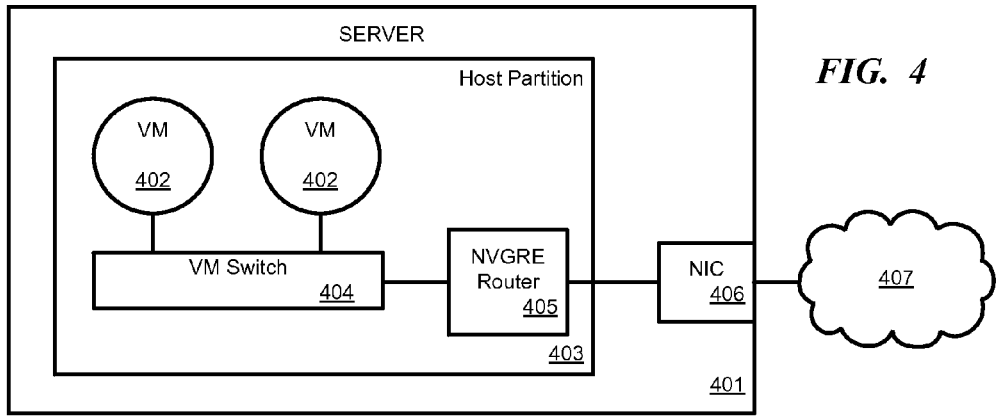
FIG. 4 illustrates a server used in a host datacenter according to one embodiment.

FIG. 4 illustrates a server used in a host datacenter according to one embodiment. Server or computer system 401 hosts a plurality of VMs 402 on host partition 403. VMs 402 communicate with each other or with remote devices and via a VM Switch 404.

In one embodiment, Generic Routing Encapsulation (GRE) is used for tenant address virtualization. GRE encapsulation—like any other encapsulation—requires an entity that maps and encapsulates a tenant IP address (i.e., CA) to an IP address in the provider address (PA) space. Mapping CA/PA and creating the appropriate GRE header may be performed by a software agent, such as network virtualization GRE (NVGRE) router 405, running in the host partition of host server 401. Outbound VM traffic is processed by NVGRE router 405 and all frames are encapsulated with appropriate GRE header before transmission to network interface card (NIC) 406 and over the network 407. Similarly all inbound VM traffic from network 407 is processed by NVGRE router 405 and—after identifying and verifying the tenant and removing the GRE header—is sent to the destination VM 402.

Using the NVGRE router software agent, every server 401 in a datacenter can act as its own router. The NVGRE router can be used to build any routing topology using a network virtualization policy. The NVGRE router acts like a physical router so that the network virtualization is transparent to the VMs 402.

Using this integrated routing functionality, the host server can make a direct forwarding decision based on virtual network policies to determine whether the destination subnet is within the same routing domain (RDID) or virtual subnet (VSID). Packets can be delivered directly from the source host to the destination host without going through a separate virtual router on the datacenter network. The NVGRE router acts internally as a distributed router to make forwarding decisions just like a real router does in physical or virtual form. This distributed router functionality is utilized to support the multi-subnet topologies described below.

Using the NVGRE forwarding functionality, there is no need for a gateway or appliance to route virtual network VM-to-VM traffic. However, a gateway is still used to route traffic between virtual network VMs and non-virtual network systems. The NVGRE router is provisioned with all of the CA-PA mapping records for all VMs in all subnets of the customer so that it can forward packets on its own.

Figure 5:
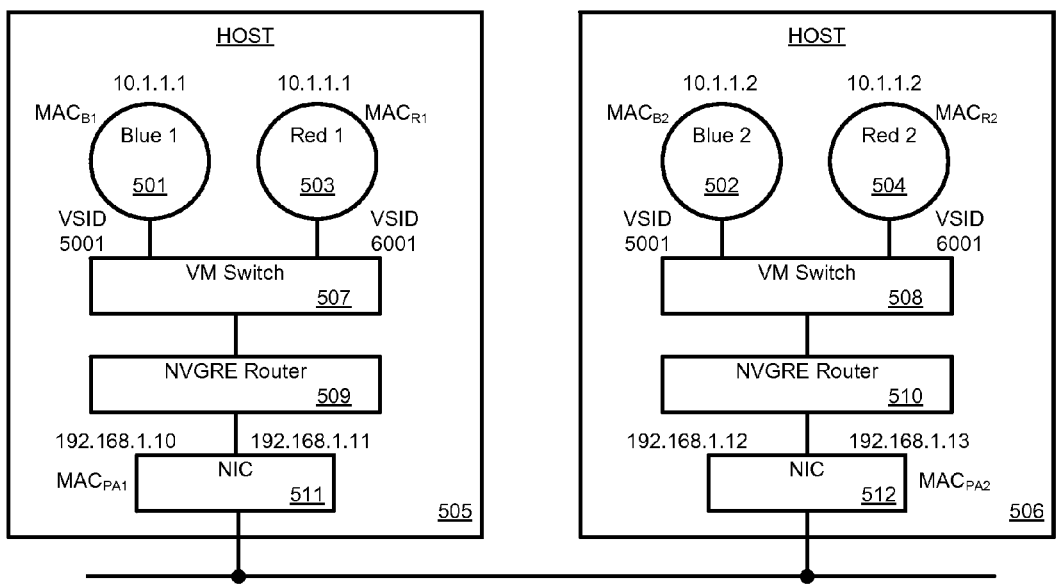
FIG. 5 illustrates virtualization of networks sharing the same customer address space.

FIG. 5 illustrates virtualization of networks sharing the same customer address space. Tenant Blue's network is deployed on VMs 501, 502 in the datacenter and is assigned VSID 5001. VM 501 has a CA of 10.1.1.1 on the Blue virtual network, and a MAC address of $MAC_{B1}$ on host machine 505. VM 502 has a CA of 10.1.1.2 on the Blue virtual network, and a MAC address of $MAC_{B2}$ on host machine 506.

Tenant Red's network is deployed to VMs 503, 504 and is assigned VSID 6001. VM 503 has a CA of 10.1.1.1 on the Red virtual network, and a MAC address of $MAC_{R1}$ on host machine 505. VM 504 has a CA of 10.1.1.2 on the Red virtual network, and a MAC address of $MAC_{R2}$, on host machine 506.

VM switches 507, 508 perform address resolution and access control when routing packets between the VMs and track the VSIDs for each tenant's virtual networks. For example, VM switch 507 knows that VM 501 and VM 503 are on different virtual networks with different VSIDs. VM switch 507 uses this information to route packets to appropriate VM 501, 503 even though both have the same IP address—10.1.1.1 in the CA space.

NVGRE routers 509, 510 use and enforce a network virtualization, such as policy 204 (FIG. 2), to route packets to the correct host. The virtualization policy maps tenant the CA space to the appropriate datacenter PA space. NVGRE routers 509, 510 encapsulate packets from VMs 501-504 for routing between hosts 505, 506.

NICs 511, 512 have one or more IP addresses in the PA space for the datacenter. NICs 511, 512 also have a MAC address for routing packets. For example, NIC 511 has IP addresses 192.168.1.10 and 192.168.1.11 and $MAC_{pA1}$, and NIC 512 has IP addresses 192.168.1.12 and 192.168.1.13 and $MAC_{pA2}$.

Figure 6:
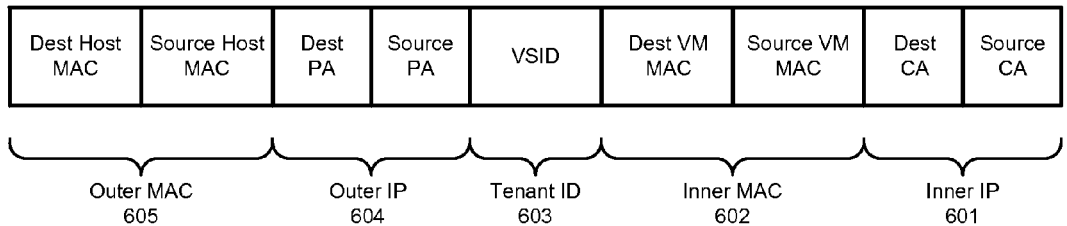
FIG. 6 illustrates an encapsulated packet header using the customer address, provider access, and MAC addresses of the virtual machines and hosts.

FIG. 6 illustrates an encapsulated packet header using the CA, PA and MAC addresses of the VMs and Hosts. In one embodiment, the GRE protocol is used for encapsulation. However, any suitable encapsulation protocol may be used that allows tenant VM information, such as a VSID, VM MAC address, and CA to be transmitted in a packet. The NVGRE router performs encapsulation and decapsulation in one embodiment.

Inner IP 601 includes the destination and source CA for the tenant's services. Inner MAC 602 includes the destination and source MAC addresses for the VMs running the tenant's services. Tenant ID 603 includes a virtual subnet identifier for the tenant. Although different tenants may use the same IP addresses (i.e. CAs) on their networks, the combination of Tenant ID 603 and Inner IP 601 uniquely identify services in different tenant virtual networks.

Figure 7:
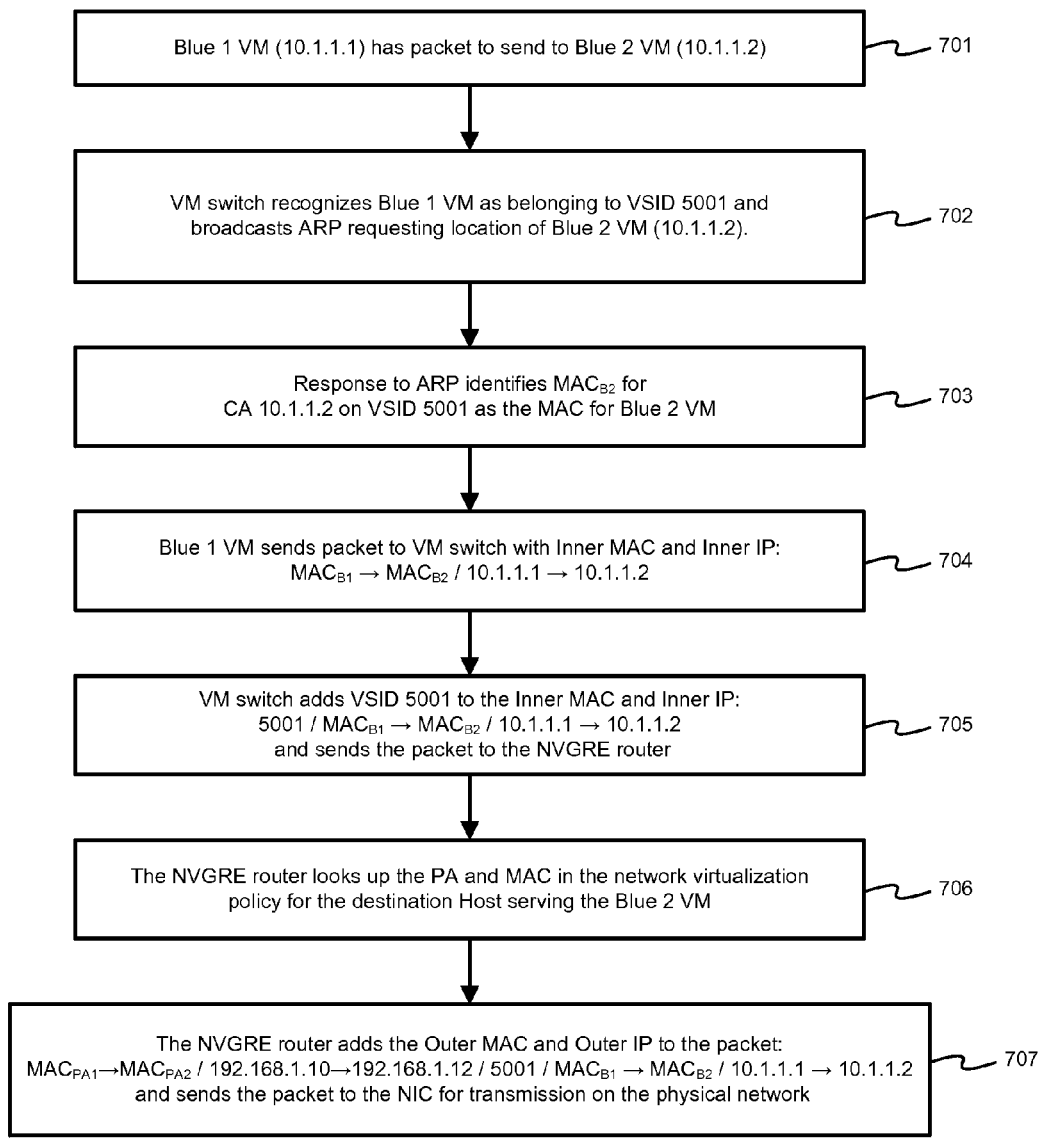
FIG. 7 is a flowchart illustrating the construction of an encapsulated packet header to be sent from one virtual machine to another within a tenant's virtual network.

FIG. 7 is a flowchart illustrating the construction of an encapsulated packet header to be sent from one VM to another within a tenant's virtual network where the VMs are hosted on separate servers, such as the Blue 1 VM 501 and Blue 2 VM 502 show in FIG. 5. In step 701, the Blue 1 VM at CA 10.1.1.1 generates a packet to send to the Blue 2 VM at CA 10.1.1.2. The Blue 1 VM requests the MAC address for Blue 2 VM from the VM switch. In step 702, the VM switch recognizes the Blue 1 VM as belonging to Blue tenant's virtual network and broadcasts an address resolution protocol (ARP) message requesting an answer for 10.1.1.2 on VSID 5001. The ARP message is sent to local VMs on the VSID 5001 network and to a network virtualization datacenter manager.

In step 703, the NVGRE router sends a response to the ARP based on the network virtualization policy as shown in FIG. 2 204. The VM switch receives a response to the ARP message that identifies $MAC_{B2}$ as the MAC address for the Blue 2 VM having CA 10.1.1.2 on VSID 5001. In step 704, Blue 1 VM then sends a packet to the VM switch with an Inner MAC ($MAC_{B1} \rightarrow MAC_{B2}$) and Inner IP (10.1.1.1→10.1.1.2). The Blue 1 VM is not aware that the Inner IP is a virtual network address and it does not need to add any additional routing information to the packet.

In step 705, the VM switch adds a tenant subnet ID—VSID 5001 in this case—associated with the packet header and then sends the packet to the NVGRE router. In step 706, the NVGRE router looks up the PA and MAC in a network virtualization policy for the host server corresponding to the destination CA and VSID. In step 707, the NVGRE router adds the Outer MAC ($MAC_{pA1} \rightarrow MAC_{pA2}$) and Outer IP (192.168.1.10→192.168.1.12) and the VSID. The NVGRE router then sends the packet to the NIC for transmission to other host servers on the physical network.

Figure 8:
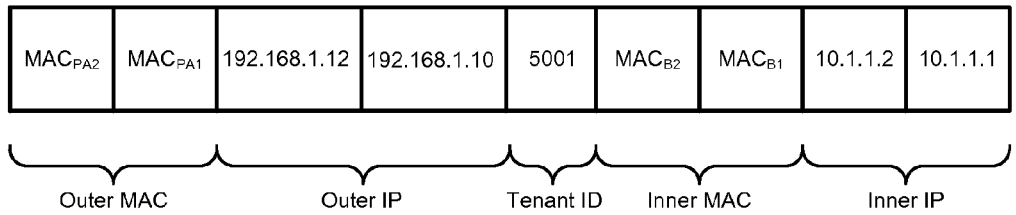
FIG. 8 illustrates an encapsulated packet header according to the example embodiment described in FIG. 7.

FIG. 8 illustrates an encapsulated packet header according to the example embodiment described in FIG. 7. This packet header is sent by the NIC on the machine hosting Blue 1 VM to the NIC for the machine hosting the Blue 2 VM.

Figure 9:
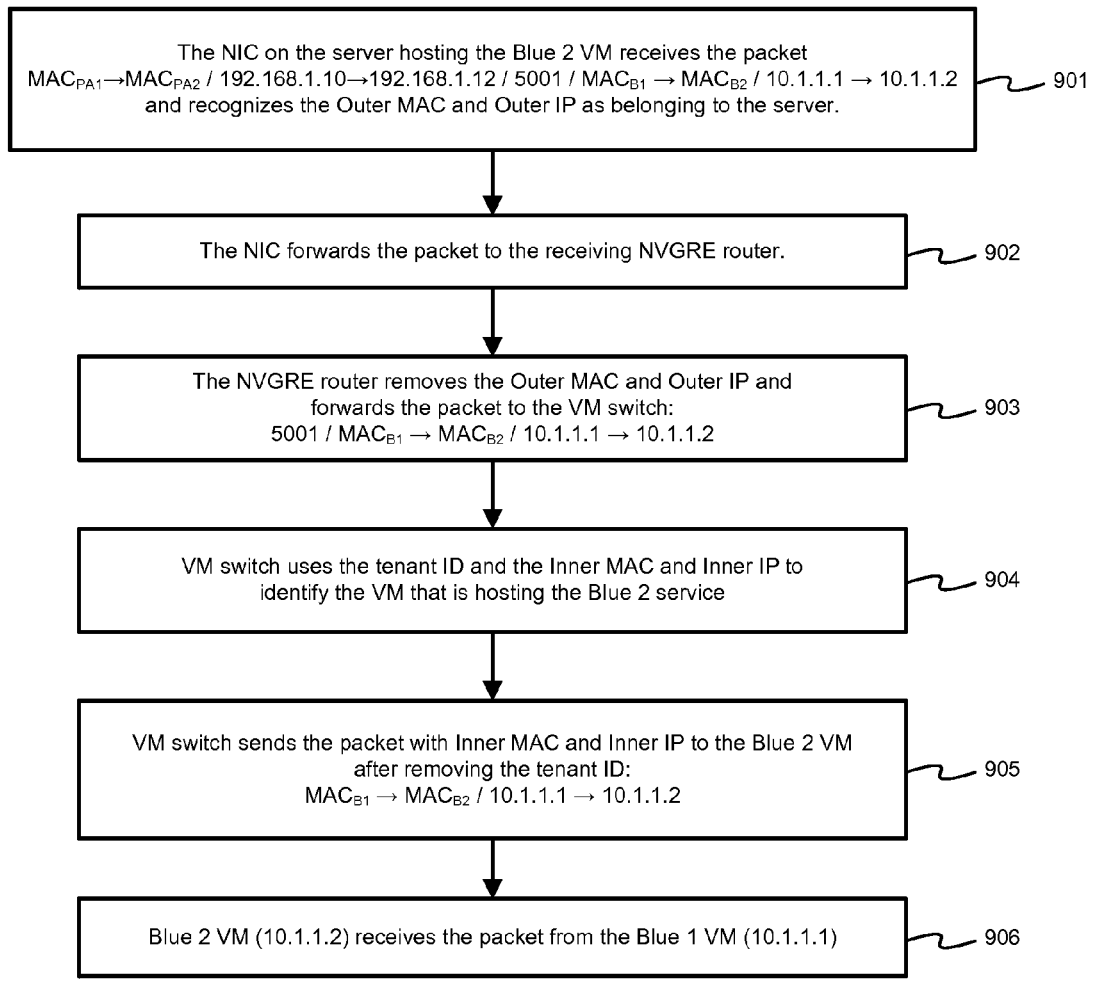
FIG. 9 is a flowchart illustrating processing and routing of a received encapsulated packet header.

FIG. 9 is a flowchart illustrating processing and routing of a received encapsulated packet. In step 901, the NIC on the server hosting the destination Blue 2 VM receives the packet and recognizes the Outer MAC ($MACp_{A1} \rightarrow MAC_{PA2}$) and Outer IP (192.168.1.10→192.168.1.12) as belonging to that server. The NIC forwards the packet to the NVGRE router in step 902. In step 903, the NVGRE router removes the Outer MAC and Outer IP and forwards the packet to the VM switch.

The VM switch may support multiple VMs that are using overlapping CA spaces. In step 904, the VM switch uses the tenant ID or VSID to determine which VM belongs to the virtual network for the incoming packet. In step 905, the VM switch removes the tenant ID and forwards the packet to the destination VM with the Inner MAC ($MAC_{B1} \rightarrow MAC_{B2}$) and Inner IP (10.1.1.1→10.1.1.2). In step 906, the destination Blue 2 VM receives the packet and processes it accordingly.

Figure 10:
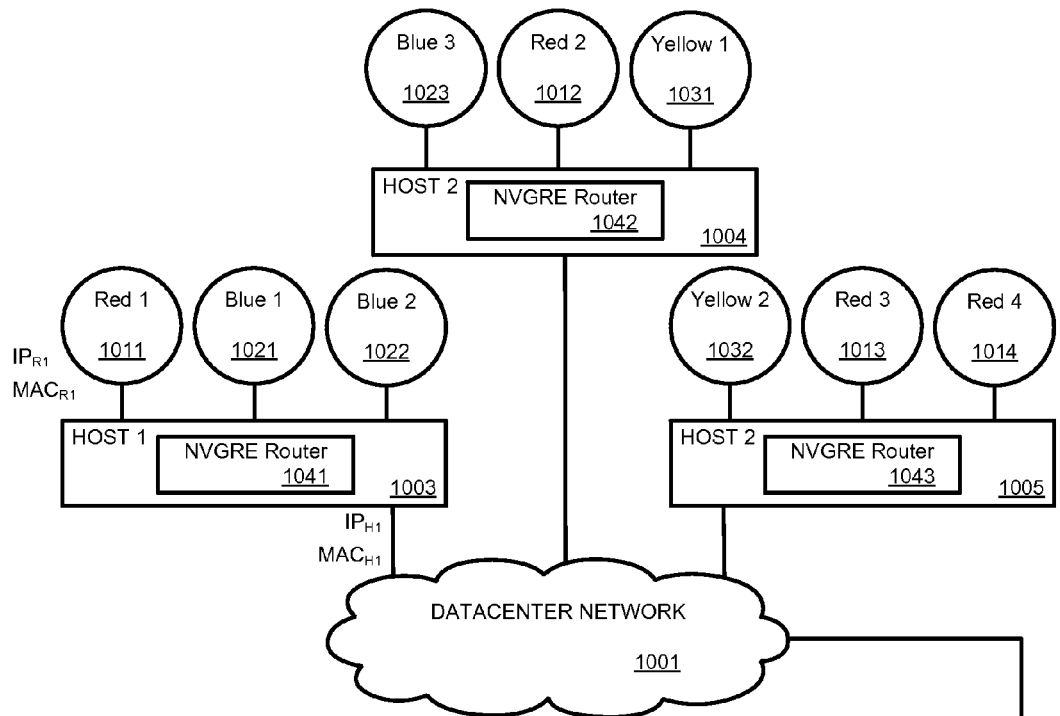
FIG. 10 illustrates a hybrid network in which customer services are deployed in on VMs in a virtual network run on datacenter network.
Figure 10:
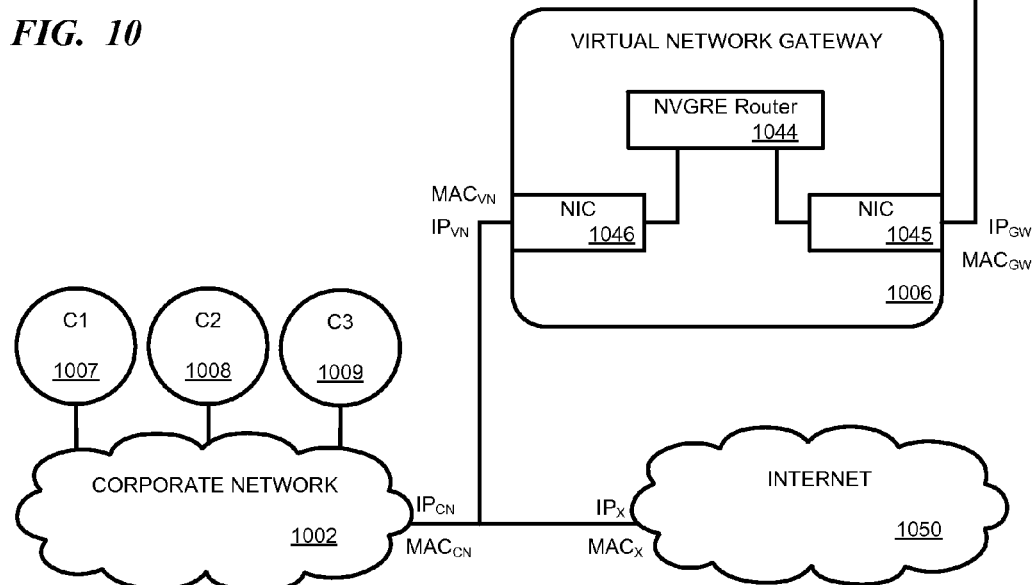

FIG. 10 illustrates a hybrid network in which customer services are deployed on VMs in a virtual network run on datacenter network 1001. A corporate network or private cloud 1002 is also used for other services. Datacenter 1001 has a plurality of host machines 1003-1005 that support numerous VMs. Services for three virtual subnets—Red, Blue, and Yellow—are deployed on VMs that are spread across hosts 1003-1005. The Red subnet is deployed VMs 1011-1014 with virtual subnet identifier $VSID_{RED}$. The Blue subnet is deployed on VMs 1021-1023 with virtual subnet identifier $VSID_{BLUE}$. The Yellow subnet is deployed on VMs 1031-1032 with virtual subnet identifier $VSID_{YELLOW}$. The CA space on each subnet may overlap a CA space on another subnet, but—as described above—the VSID is used by a VM switch (not shown) on hosts 1003-1005 to identify which VM is intended when such CA overlaps occur.

A virtual network router, such as NVGRE routers 1041-1043, on each host 1003-1005 encapsulates packets that are forwarded among the VMs on different hosts. The NVGRE routers follow a network virtualization policy that defines mappings between a tenant CA space and the PA space on the datacenter network 1001. Packets are routed among the VMs as described above using the network virtualization policy. NVGRE routers 1041-1043 operate as distributed routers that support a multiple VM network topology that is indexed by both RDID and VSID.

Virtual network gateway 1006 provides an interface to corporate network 1002 and Internet 1050 for packets that are not addressed to any of the virtual networks on datacenter network 1001. All off-network traffic goes through gateway 1006, which has all of the virtual network policy information so that it can route packets to the correct host 1003-1005 and VM or to the correct external entity. If a VM sends a packet to a destination IP address that is not known to its host and there is on entry for the destination IP address in the NVGRE router's virtual network policy, then that packet is forwarded to gateway 1006 by default for further routing.

Gateway 1006 has a virtual network router, such as NVGRE router 1044 that recognizes the IP address space for packets directed to corporate network 1006 and entities supported by that external network, such as computers C1-C3 1007-1009. Gateway 1006 will forward packets to corporate network 1002 or to Internet 1050, if the destination IP address does not match any known IP addresses on corporate network 1002. Corporate network 1002 then routes the forwarded packets to the appropriate computer C1-C3 1007-1009.

Virtual network gateway 1006 exposes an IP address ($IP_{GW}$) and MAC address ($MAC_{GW}$) to the datacenter network and hosts 1003-1005 at NIC 1045 and exposes another IP address ($IP_{VN}$) and MAC address ($MAC_{VN}$) to the external networks at NIC 1046. Devices on corporate network 1002 expose IP addresses ($IP_{CN}$) and MAC addresses ($MAC_{CN}$) to gateway 1006. The corporate network 1002 may support one or more subnets $VSID_{CN}$.

Using encapsulation, NVGRE routers 1041-1044 can forward packets between VMs on hosts 1003-1005 and devices on corporate network 1002. For example, the Red 1 VM 1011 can generate a packet to send to computer C1 1007 ($IP_{C1}$) on the corporate network without knowing that computer C1 is on an external network. The VM switch on host 1003 will receive an ARP response to route the packet using the MAC address of gateway 1006. NVGRE 1041 will recognize the destination as an external device and will encapsulate the packet for forwarding to gateway 1006.

NVGRE 1041 will create a packet header with an Inner MAC ($MAC_{R1} \rightarrow MAC_{GW}$) and Inner IP ($IP_{R1} \rightarrow IP_{C1}$). The tenant subnet identifier $VSID_{GW}$ is included in the packet header to indicate that C1 is part of the external corporate network or other destination routed through the gateway 1006. The NVGRE router refers to the network virtualization policy and adds the Outer MAC ($MAC_{H1} \rightarrow MAC_{GW}$) and Outer IP ($IP_{H1} \rightarrow IP_{GW}$). The NVGRE router then sends the packet to the NIC for transmission on the physical network.

Figure 11:
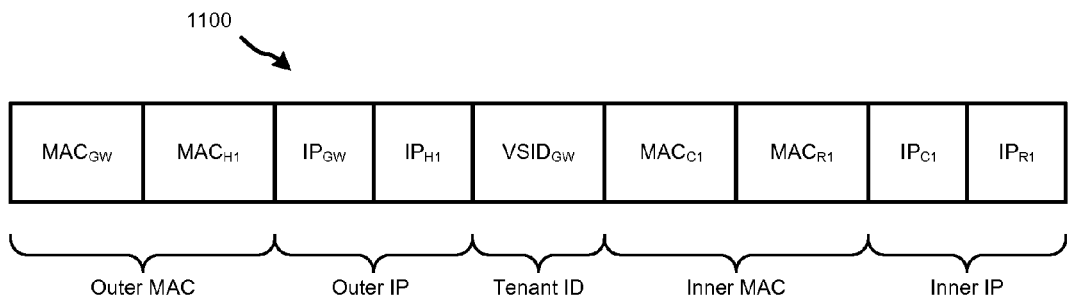
FIG. 11 illustrates an example packet header routed from a host machine to a gateway.
Figure 12:
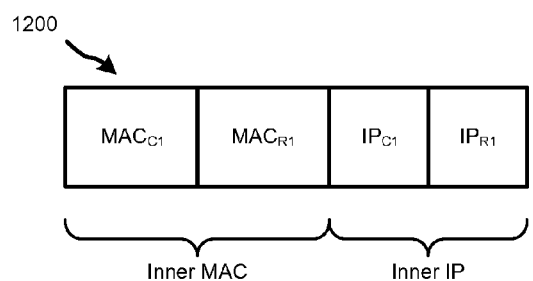
FIG. 12 illustrates a packet forwarded to a corporate network from a gateway.

FIG. 11 illustrates an example packet header 1100 routed from host 1003 to gateway 1006 using the parameters described above. Packet header 1100 is routed to NVGRE 1044 within gateway 1006 for further routing. NVGRE 1044 recognizes the subnet of $IP_{c1}$ as indicating an external network. Accordingly, NVGRE 1044 removes the Outer MAC, Outer IP and VSID and forwards the packet to corporate network 1006 using the inner packet header 1200 as illustrated in FIG. 12.

Figure 13:
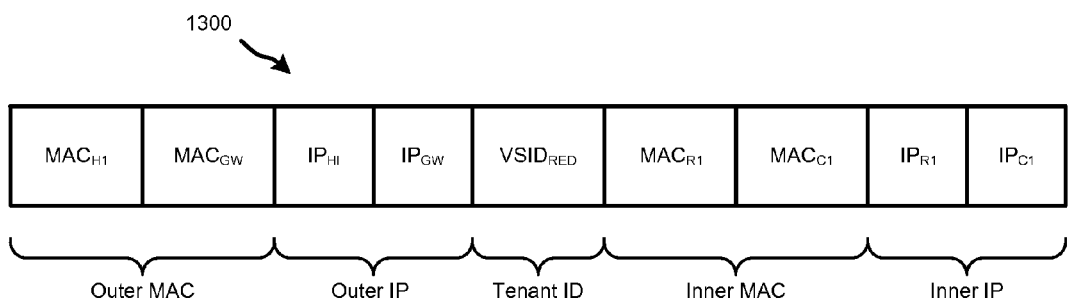
FIG. 13 illustrates an example packet header routed from a gateway to a host machine.

When return packets are received at gateway 1006 from corporate network 1002, the NVGRE router 1044 builds a new encapsulated packet header 1300—as illustrated in FIG. 13—to forward the packet to the Red 1 service on VM 1011.

Packets directed to or received from Internet 1050 may be routed in a similar manner as packets associated with corporate network 1002. For example, any packet sent by a VM to a destination not recognized by the virtual network router or not listed on the network virtualization policy may be routed to gateway 1006 as a default. The gateway 1006 may then attempt address resolution and forward the packet to the proper destination on Internet 1050.

The virtual network router or NVGRE router can be used to scale any network size or configuration. It will be understood that, even though virtual machines running on host servers are used in the examples above, the virtual network router can be used with any other device, such as a load balancer, firewall device, network address translation (NAT) device, or the like.

Customers can deploy network virtualization in their existing datacenters using the IP virtualization mechanism without requiring any hardware upgrades or topology changes. The CA IP address is virtualized by using the PA when sending networking traffic between different end hosts. For most environments, Generic Routing Encapsulation (GRE) may be used for network virtualization, because it provides flexibility and performance.

In GRE, the router encapsulates the VM's packet (using CA IP addresses) inside another packet (using PA IP addresses). The header of the new packet also contains a copy of the Virtual Subnet ID. An advantage of GRE is that because the Virtual Subnet ID is included in the packet, network equipment can apply per-tenant policies on the packets, enabling efficient traffic metering, traffic shaping, and intrusion detection. Another key advantage of GRE is that all the VMs residing on a given end host can share the same PA because the Virtual Subnet ID can be used to differentiate the various IP addresses from different virtual subnets. Sharing the PA has a big impact on scalability. The number of IP and MAC addresses that need to be learned by the network infrastructure can be substantially reduced.

While GRE may be the network virtualization approach used for most current and future datacenters, some current datacenters may need greater scalability than can be achieved with current generation hardware. For these environments, IP Rewrite provides a second IP virtualization mechanism. With IP Rewrite, the source and destination CA IP addresses in the packet are rewritten with the appropriate PA addresses as packets leave the end host. Similarly, when virtual subnet packets enter the end host the PA IP addresses are rewritten with appropriate CA addresses. IP Rewrite requires one unique PA per VM CA, unlike GRE encapsulation where all VMs on a host can share a single PA. An advantage of IP Rewrite is that the packet format is not changed. In addition, IP Rewrite is fully compatible with existing network equipment, which does not see any new traffic types or formats. However, the Virtual Subnet ID is not transmitted on the network, so that existing network equipment cannot perform per-tenant packet processing.

Figure 14:
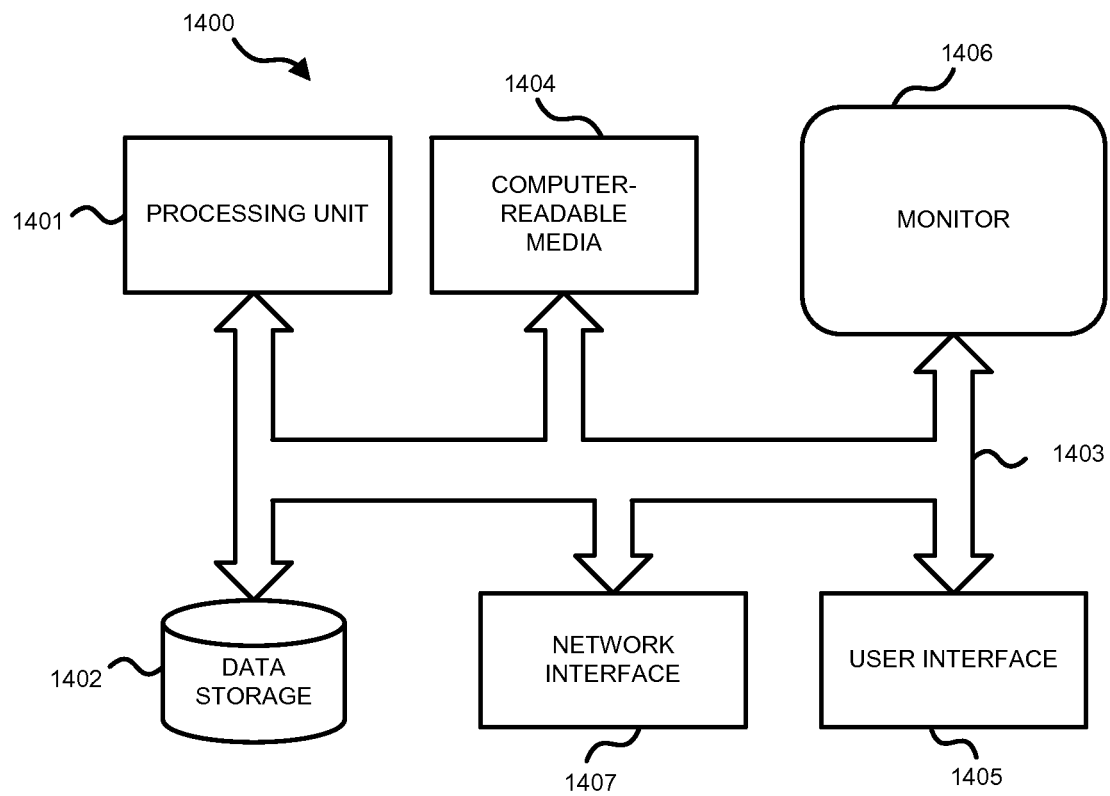
FIG. 14 illustrates an example of a suitable computing and networking environment.

FIG. 14 illustrates an example of a suitable computing and networking environment 1400 on which the examples of FIGS. 1-10 may be implemented. The computing system environment 1400 is only one example of a suitable computing environment and is not intended to suggest any limitation as to the scope of use or functionality of the invention. The invention is operational with numerous other general purpose or special purpose computing system environments or configurations. Examples of well-known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 14, an exemplary system for implementing various aspects of the invention may include a general purpose computing device in the form of a computer 1400. Components may include, but are not limited to, various hardware components, such as processing unit 1401, data storage 1402, such as a system memory, and system bus 1403 that couples various system components including the data storage 1402 to the processing unit 1401. The system bus 1403 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1400 typically includes a variety of computer-readable media 1404. Computer-readable media 1404 may be any available media that can be accessed by the computer 1400 and includes both volatile and nonvolatile media, and removable and non-removable media, but excludes propagated signals. By way of example, and not limitation, computer-readable media 1404 may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1400. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media. Computer-readable media may be embodied as a computer program product, such as software stored on computer storage media.

The data storage or system memory 1402 includes computer storage media in the form of volatile and/or nonvolatile memory such as read only memory (ROM) and random access memory (RAM). A basic input/output system (BIOS), containing the basic routines that help to transfer information between elements within computer 1400, such as during start-up, is typically stored in ROM. RAM typically contains data and/or program modules that are immediately accessible to and/or presently being operated on by processing unit 1401. By way of example, and not limitation, data storage 1402 holds an operating system, application programs, and other program modules and program data.

Data storage 1402 may also include other removable/non-removable, volatile/nonvolatile computer storage media. By way of example only, data storage 1402 may be a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The drives and their associated computer storage media, described above and illustrated in FIG. 14, provide storage of computer-readable instructions, data structures, program modules and other data for the computer 1400.

A user may enter commands and information through a user interface 1405 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs using hands or fingers, or other natural user interface (NUI) may also be used with the appropriate input devices, such as a microphone, camera, tablet, touch pad, glove, or other sensor. These and other input devices are often connected to the processing unit 1401 through a user input interface 1405 that is coupled to the system bus 1403, but may be connected by other interface and bus structures, such as a parallel port, game port or a universal serial bus (USB). A monitor 1406 or other type of display device is also connected to the system bus 1403 via an interface, such as a video interface. The monitor 1406 may also be integrated with a touch-screen panel or the like. Note that the monitor and/or touch screen panel can be physically coupled to a housing in which the computing device 1400 is incorporated, such as in a tablet-type personal computer. In addition, computers such as the computing device 1400 may also include other peripheral output devices such as speakers and printer, which may be connected through an output peripheral interface or the like.

The computer 1400 may operate in a networked or cloud-computing environment using logical connections 1407 to one or more remote devices, such as a remote computer. The remote computer may be a personal computer, a server, a router, a network PC, a peer device or other common network node, and typically includes many or all of the elements described above relative to the computer 1400. The logical connections depicted in FIG. 14 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 1400 may be connected to a public or private network through a network interface or adapter 1407. In some embodiments, a modem or other means for establishing communications over the network. The modem, which may be internal or external, may be connected to the system bus 1403 via the network interface 1407 or other appropriate mechanism. A wireless networking component such as comprising an interface and antenna may be coupled through a suitable device such as an access point or peer computer to a network. In a networked environment, program modules depicted relative to the computer 1400, or portions thereof, may be stored in the remote memory storage device. It may be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A virtual network router, comprising:
   a processor; and
   a memory coupled to the processor, the memory having program instructions stored thereon that, upon execution by the processor, cause the virtual network router to:
   receive a packet;
   determine, based at least in part on a virtual networking policy, a destination virtual subnet;
   determine, based at least in part on the virtual networking policy, a destination host address for a destination virtual machine host;
   create an encapsulated packet from the received packet by adding destination host address information to the packet;
   forward the encapsulated packet to a destination virtual machine;
   receive another packet;
   determine that no entry exists in the virtual networking policy for a destination virtual machine address in the other packet;
   encapsulate the another packet using address information for a gateway router; and
   forward the another packet to the gateway router.

2. The virtual network router of claim 1, wherein the virtual networking policy comprises a mapping table, and wherein the mapping table associates address information for virtual machines with addresses for virtual machine hosts.

3. The virtual network router of claim 2, wherein the virtual networking policy further identifies a virtual subnet associated with each virtual machine.

4. The virtual network router of claim 1, wherein to determine the destination host address for the destination virtual machine, the program instructions, upon execution by the processor, further cause the virtual network router to:
   identify a virtual subnet identifier in the packet;
   identify a destination virtual machine address in the packet; and
   use the virtual subnet identifier and destination virtual machine address to determine the destination host address.

5. The virtual network router of claim 1, wherein the destination host address information further comprises at least one of a destination MAC address and a destination IP address.

6. The virtual network router of claim 1, wherein to forward the encapsulated packet to the destination virtual machine, the program instructions, upon execution by the processor, further cause the virtual network router to:
   receive an encapsulated packet from another virtual network router;
   decapsulate the encapsulated packet by removing host machine address information; and
   forward the decapsulated packet to a virtual machine switch, wherein the virtual machine switch is configured to route the decapsulated packet to a destination.

7. The virtual network router of claim 1, wherein the encapsulated packet is created using Generic Routing Encapsulation (GRE).

8. A device comprising computer-readable medium having program instruction stored thereon that, upon execution by a processor of a virtual network router, cause the virtual network router to:
   receive a packet;
   determine, based at least in part on a virtual networking policy, a destination virtual subnet;
   determine, based at least in part on the virtual networking policy, a destination host address for a destination virtual machine host;
   create an encapsulated packet from the received packet by adding destination host address information to the packet;
   forward the encapsulated packet to a destination virtual machine;
   receive another packet;
   determine that no entry exists in the virtual networking policy for a destination virtual machine address in the another packet;
   encapsulate the another packet using address information for a gateway router; and
   forward the another packet to the gateway router.

9. The device of claim 8, wherein to forward the packet to the destination virtual machine, the program instructions, upon execution by the processor, further cause the virtual network router to:
   encapsulate the packet with a new header comprising routing information for the physical machine hosting the destination virtual machine.

10. The device of claim 8, wherein the received packet is received from an external network.

11. The device of claim 10, wherein to forward the packet to the destination virtual machine, the program instructions, upon execution by the processor, further cause the virtual network router to:
    decapsulate the received packet to identify the address information for the destination virtual machine and the virtual subnet identifier.

12. The device of claim 8, wherein to identify the destination address information from the network virtualization policy, the program instructions, upon execution by the processor, further cause the virtual network router to:
    map the address information for the destination virtual machine to an address for the physical machine based at least in part on the virtual subnet identifier.

13. The device of claim 8, wherein to forward the packet to the destination virtual machine, the program instructions, upon execution by the processor, further cause the virtual network router to:
    encapsulate the packet by inserting address information into a header of the packet; and
    send the encapsulated packet to an external network.

14. A method of operating a computing device in a virtualized computing environment, the method comprising:
    receiving a packet;
    determining, based at least in part on a virtual networking policy, a destination virtual subnet;
    determining, based at least in part on the virtual networking policy, a destination host address for a destination virtual machine host;
    creating an encapsulated packet from the received packet by adding destination host address information to the packet;
    forwarding the encapsulated packet to a destination virtual machine;
    receiving another packet;
    determining that no entry exists in the virtual networking policy for a destination virtual machine address in the other packet;
    encapsulating the another packet using address information for a gateway router; and
    forwarding the another packet to the gateway router.

15. The method of claim 14, wherein forwarding the packet to the destination virtual machine comprises:
    encapsulating the packet with a new header comprising routing information for the physical machine hosting the destination virtual machine.

16. The method of claim 14, further comprising:
    decapsulating the received packet to identify the address information for the destination virtual machine and the virtual subnet identifier.

17. The method of claim 14, wherein identifying destination address information from a network virtualization policy further comprises:
    mapping the address information for the destination virtual machine to an address for the physical machine based at least in part on the virtual subnet identifier.

18. The method of claim 14, wherein forwarding the packet to the destination virtual machine comprises:
    encapsulating the packet by inserting address information into a header of the packet; and
    forwarding the packet comprises sending the encapsulated packet to an external network.

\* \* \* \* \*